June 18, 1968 F. J. HAINES 3,389,273

TEMPERATURE COMPENSATED MULTIVIBRATOR

Filed Feb. 5, 1965

INVENTOR
FREDERICK J. HAINES

BY Spencer E. Olson

ATTORNEY

United States Patent Office 3,389,273 Patented June 18, 1968

3,389,273
TEMPERATURE COMPENSATED MULTIVIBRATOR

Frederick J. Haines, Alexander, N.Y., assignor to Sylvania Electric Products Inc., a corporation of Delaware Filed Feb. 5, 1965, Ser. No. 430,564
1 Claim. (Cl. 307—310)

ABSTRACT OF THE DISCLOSURE

Temperature-compensating network incorporated in the circuitry of one transistor of a two-transistor monostable multivibrator. The network includes a transistor having substantially the same characteristics as the multivibrator transistor with which it is associated. The compensating transistor is connected such that a leakage current is developed at its emitter due to temperature changes in the same manner as the associated multivibrator transistor. The emitters of both transistors are connected in common to a series combination of a resistor and a voltage source. The leakage currents from both of the transistors have the effect of changing the voltage across the resistor, which changed voltage, in turn, alters the current flow through the associated multivibrator transistor so as to compensate for the temperature changes therein.

Figure 1:
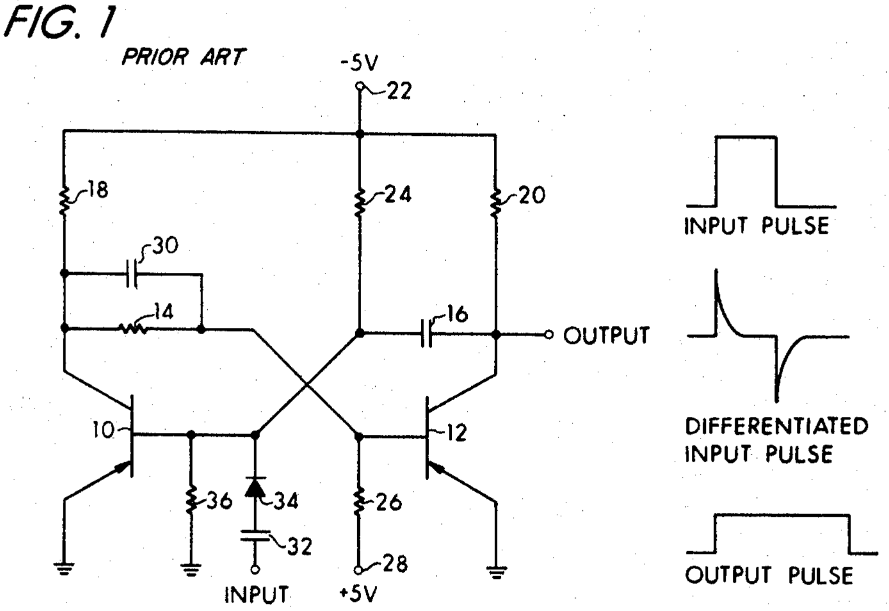
FIG. 1 PRIOR ART

The present invention relates to electronic pulse forming circuits, and more particularly to an improved temperature-compensated solid state monostable multivibrator.

The advent of the transistor has materially advanced the electronics art, primarily because of its advantages over the vacuum tube of lower power consumption, small space requirements, and longer life. However, most transistors have certain inherent instabilities which have an adverse effect on circuit parameters when it has been attempted to substitute them for vacuum tubes in certain types of electronic circuits. One particularly troublesome transistor instability is the tendency of the effective internal resistance, particularly the base-to-emitter forward bias voltage drop, to change with temperature. This has been of particular concern in transistor monostable multivibrators in which there is a tendency for the width of the output pulse to vary considerably with changes in ambient temperature. This is not a serious problem with vacuum tube monostable multivibrators because of the small changes in tube parameters with changes in temperature, but it has been observed that in transistorized monostable multivibrators pulse width variations of 10% to 15% occur over a temperature range of 50° C. Attempts have been made to compensate for these variations through the use of thermistors, but they have been found very difficult to optimize in practice. Temperature controlled ovens have also been used to maintain the transistors at a constant temperature, but this solution often is not feasible because of space, power consumption or cost considerations.

It is a primary object of the present invention to provide a transistorized monostable multivibrator whose pulse width is relatively constant with changes in temperature.

Another object of the invention is to provide a relatively simple and inexpensive temperature-compensated transistorized monostable multivibrator.

In accordance with the particular embodiment of the invention to be described, a compensating circuit is incorporated in the circuitry of one of the transistors of a two-transistor monostable multivibrator. This compensating network includes an additional transistor having substantially the same characteristics as the transistor with which it is associated which is connected to develop a leakage current between two of its electrodes, and which has one of these electrodes connected to a common impedance with a corresponding electrode of the associated transistor in the multivibrator. The common impedance serves to control the respective magnitudes of the leakage currents in each transistor, which currents increase as the temperature increases. The increased leakage currents increase the voltage across the common impedance, which, in turn, tends to decrease the current flow through the transistor in the multivibrator so as to compensate for the increase in leakage current.

Figure 2:
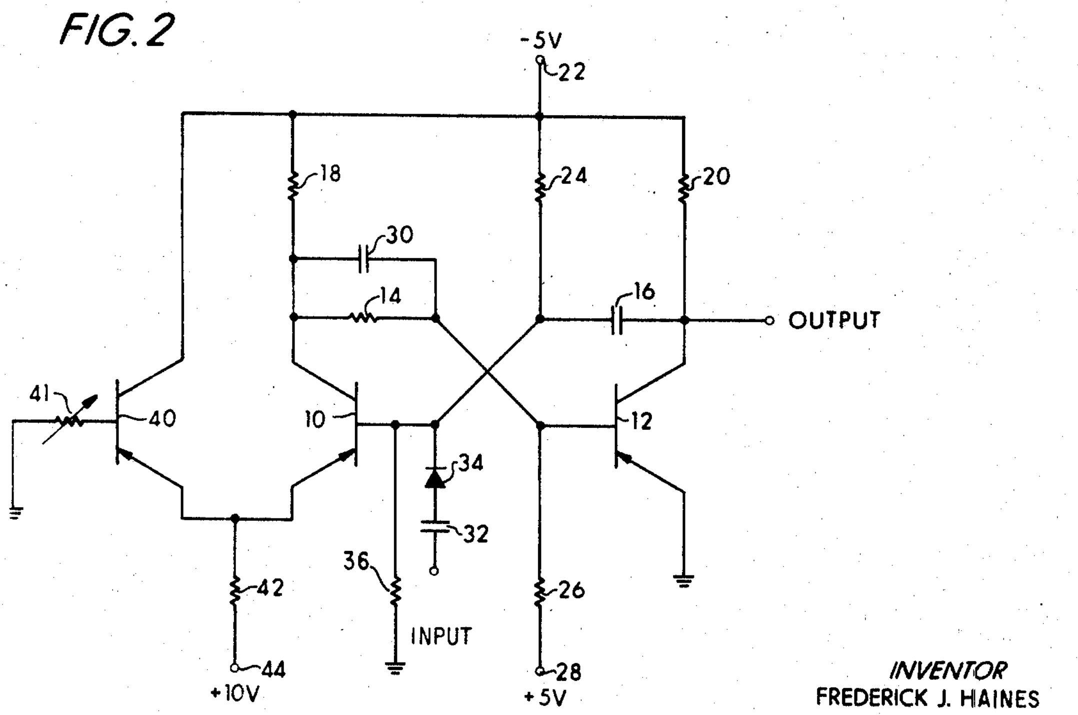

Other objects, features and advantages of the invention, and a better understanding of its construction and operation, will be apparent from the following description, taken in conjunction with the accompanying drawings, in which:

FIG. 1 is a circuit diagram of a prior art uncompensated transistorized monostable multivibrator; and FIG. 2 is a circuit diagram of a transistorized monostable multivibrator constructed in accordance with a preferred embodiment of the invention.

The monostable multivibrator circuit of FIG. 1, which has one stable state, includes a pair of P-N-P transistors 10 and 12, the emitter electrode of both of which are grounded. The collector electrode of transistor 10 is direct current coupled through resistor 14 to the base electrode of transistor 12, and the collector electrode of transistor 12 is capacitively cross-connected to the base electrode of transistor 10 by capacitor 16. The collectors of transistors 10 and 12 are respectively connected through resistors 18 and 20 to a source of negative potential, for example, −5 volts, represented by terminal 22, and the base electrode of transistor 10 is connected through resistor 24 to potential source 22. The base electrode of transistor 12 is connected through resistor 26 to a source of positive potential, for example +5 volts, represented by terminal 28. A capacitor 30 connected in parallel with resistor 14 increases the speed of transfer of signals from the collector of transistor 10 to the base of transistor 12.

In the stable state of this circuit, current flows from voltage source 22 through resistor 24 to the base of transistor 10 causing it to conduct and drawing its collector to ground potential. The voltage divider consisting of resistors 14 and 26 place a net positive voltage on the base of transistor 12, holding it in a cut-off condition.

When a rectangular trigger pulse is applied through capacitor 32 and diode 34 it is differentiated by capacitor 32 and resistor 36, and the positive-going spike applied to the base of transistor 10 drives it out of conduction, causing its collector to approach a potential of −5 volts. This causes current to flow through resistor 14 to the base of transistor 12, causing it to conduct. The collector of transistor 12 goes rapidly from −5 volts to 0 volt, thus placing a voltage across capacitor 16. Instantaneously, a positive voltage is applied to the base electrode of transistor 10 holding it in a cut-off condition. As capacitor 16 discharges sufficiently through resistor 24 and transistor 12, transistor 10 begins to conduct and transistor 12 is turned off, to complete the cycle. Thus, the output pulse, taken from the collector of transistor 12, is a rectangular pulse having a duration determined largely by the time constant of resistor 24 and capacitor 16.

It has been found, however, that the duration of the output pulse varies considerably with ambient temperature which causes a drift in the value of the base-to-emitter forward bias voltage drop of transistor 10. This parameter drifts approximately −2.5 millivolts per degree centigrade in both germanium and silicon transistors and has the effect of changing the point at which transistor 10 resumes conduction at the conclusion of a pulse generating cycle. That is, the time of occurrence of the trailing edge of the output pulse varies with temperature.

The circuitry of FIG. 2 is an example of the concept of the present invention in which the variations with temperature of the base-to-emitter forward bias voltage drop in transistor 10 of the multivibrator of FIG. 1 is compensated to overcome the pulse width drift inherent in the circuitry of FIG. 1. The components comprising the multivibrator have the same value and are connected in the same way as in the circuit of FIG. 1; accordingly, like reference numerals have been used to identify like parts in the two circuits, and a description of the circuit connections of FIG. 2 is omitted as being superfluous. Temperature stabilization is provided by a third transistor 40 of the same type as transistor 10, and preferably matched thereto, connected in circuit with transistor 10. More specifically, the base electrode of transistor 40 is connected to ground through a variable resistor 41, its collector is directly connected to the source of negative potential 22, and its emitter is connected to the emitter of transistor 10 and through a common impedance 42 to a source of positive potential, for example +10 volts, represented by terminal 44.

With resistors 18 and 42 chosen to have the same value, for example, 1,000 ohms, the potential at the emitters of transistors 10 and 40 when the multivibrator is in its stable state is approximately 0 volt DC. Thus, the operation of the circuit of FIG. 2 is the same as that described for FIG. 1 in which the emitter of transistor 10 is also at ground potential in its stable state. However, variations in the forward bias voltage drop of the base-to-emitter junction of transistor 10 with temperature which affect the time at which transistor 10 resumes conduction are compensated by transistor 40 and the common emitter impedance 42. If transistor 40 is matched to transistor 10, there will be a comparable increase in the base-to-emitter leakage currents in both transistors with a change in temperature which produce an increase in the potential across resistor 42 which is introduced to the emitter of transistor 10. It follows that any increase in the leakage current in the transistor 40 or in the transistor 10 produces an increase of voltage across the resistor 42 which tends to reduce the current through transistor 10. The leakage current through transistor 40, therefore, has a compensating effect on the current flow through transistor 10. By proper selection of the value of resistor 42, which, as has been indicated, is preferably of the same value as the collector resistor 18 of transistor 10 to establish appropriate quiescent conditions for the monostable multivibrator, the increase in leakage current through transistor 40 due to temperature changes in that transistor can be made to equal the changes in leakage current through transistor 10. Resistor 41 is chosen to equal the value of resistor 36 to maintain equal base impedances in transistors 10 and 40. A more exact drift correction may be obtained if resistor 41 is of a value to compensate for any differences between transistors 10 and 40, and accordingly is preferably adjustable as shown. In a practical constructed embodiment of the invention, the transistors 10 and 40 were mounted in a common heat sink to eliminate temperature differences between the transistors. Monostable multivibrators constructed in accordance with the concepts of this invention have been found to deliver output pulses whose width is substantially independent of temperature. In such a constructed multivibrator the following circuit components and constants were used:

| | | |
|---|---|---|
| Resistors **18** and **42** | | 1K |
| Resistors **24** and **26** | | 22K |
| Resistors **14**, **36** and **41** | | 8.2K |
| Capacitors **30** and **32** | mmf | 220 |
| Capacitor **16** | mf | .047 |
| Transistors **10**, **12** and **40** | | Type 2N404 |
| Diode **34** | | Type 1N276 |
| Voltage source **22** | volts | −5 |
| Voltage source **28** | do | +5 |
| Voltage source **44** | do | +10 |

The invention provides, therefore, an improved and relatively simple transistor monostable multivibrator which possesses all the advantages of transistors, and which includes extremely simple circuitry to stabilize the multivibrator circuit to overcome inherent instabilities in the transistors themselves.

Although a preferred embodiment of the circuit has been described and illustrated, the circuit is susceptible of variation and modification without departing from the spirit of the invention. For example, an emitter-coupled differential amplifier fabricated on a single shared semiconductive substrate is now available and can readily be substituted for the matched pair of transistors 10 and 40. The use of this device would be exceptionally stable because of the precisely matched base-to-emitter forward bias voltage drop drift characteristics of the two active elements. Of course N-P-N transistors may also be employed instead of P-N-P with suitable changes in the polarity of the voltage sources. Therefore, it is applicant's intention that the invention not be limited to what has been particularly illustrated and described except as such limitations appear in the appended claim.

What is claimed is:

1. A solid state monostable multivibrator comprising, first and second transistors each operable to a first conducting condition or a second conducting condition and each having base, collector and emitter electrodes, means for capacitively cross-connecting the base electrode of said first transistor to the collector electrode of said second transistor, means for resistively cross-connecting the base electrode of said second transistor to the collector of said first transistor, first, second and third resistors respectively connected between the collector electrode of said first transistor, the base electrode of said first transistor, and the collector electrode of said second transistor and a first source of energizing potential of negative polarity with respect to ground potential, a fourth resistor connected between the base electrode of said second transistor and a second source of potential of positive polarity with respect to ground, a direct connection between the emitter electrode of said second transistor and ground, means for coupling a trigger pulse to the base electrode of said first transistor to operate said first transistor to said first conducting condition whereby said second transistor is operated to said second conducting condition to initiate generation of an output pulse at the collector electrode of said second transistor of predetermined duration, the connections to said first transistor producing a leakage current at the emitter electrode thereof which tends to vary with temperature changes of said first transistor to cause variations in the duration of said output pulse, and circuit means including a fifth resistor connected between the emitter electrode of said first transistor and a third source of potential having the same polarity as said second source, said third source of potential establishing a predetermined voltage potential across said fifth resistor, a third transistor having substantially the same characteristics as said first transistor and having base, emitter and collector electrodes, a resistive connection between the base electrode of said third transistor and ground, a direct connection between the collector electrode of said third transistor and said first source of potential, and a direct connection between the emitter electrode of said third transistor and the emitter electrode of said first transistor, and third transistor exhibiting a leakage current at the emitter electrode thereof which varies in accordance with temperature changes of the third transistor, said fifth resistor developing a voltage potential thereacross differing from said predetermined voltage potential in response to the simultaneous flow therethrough of the leakage currents at the emitter electrodes of the first and third transistors when said first transistor is operating in said first conducting condition, said voltage potential across said fifth resistor operating to vary the potential of the emitter electrode of said first transistor in accordance with changes in temperature of the third transistor to compensate the tendency of the leakage current in the first transistor to vary with temperature.

References Cited

UNITED STATES PATENTS

| | | | |
|---|---|---|---|
| 3,022,464 | 2/1962 | Gelenius | 330—23 |
| 3,080,488 | 3/1963 | Sem-Sandberg | 307—88.5 |
| 3,194,977 | 7/1965 | Angalone et al. | 307—88.5 |

ARTHUR GAUSS, *Primary Examiner.*

H. DIXON, *Assistant Examiner.*